United States Patent
Ding et al.

(10) Patent No.: US 12,017,207 B2
(45) Date of Patent: Jun. 25, 2024

(54) METHOD FOR SYNTHESIZING MESOPOROUS NANO-SIZED ZEOLITE BETA

(71) Applicant: Saudi Arabian Oil Company, Dhahran (SA)

(72) Inventors: Lianhui Ding, Dhahran (SA); Khalid Otaibi, Dammam (SA); Faisal Alotaibi, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/059,712

(22) Filed: Nov. 29, 2022

(65) Prior Publication Data

US 2024/0173706 A1 May 30, 2024

(51) Int. Cl.
| | |
|---|---|
| *B01J 29/70* | (2006.01) |
| *B01J 35/23* | (2024.01) |
| *B01J 35/61* | (2024.01) |
| *B01J 35/63* | (2024.01) |
| *B01J 35/64* | (2024.01) |
| *B01J 37/00* | (2006.01) |
| *B01J 37/02* | (2006.01) |
| *B01J 37/03* | (2006.01) |
| *B01J 37/04* | (2006.01) |
| *B01J 37/06* | (2006.01) |
| *C01B 39/48* | (2006.01) |

(52) U.S. Cl.
CPC .......... *B01J 29/7007* (2013.01); *B01J 35/23* (2024.01); *B01J 35/615* (2024.01); *B01J 35/617* (2024.01); *B01J 35/635* (2024.01); *B01J 35/638* (2024.01); *B01J 35/647* (2024.01); *B01J 37/0018* (2013.01); *B01J 37/0236* (2013.01); *B01J 37/03* (2013.01); *B01J 37/04* (2013.01); *B01J 37/06* (2013.01); *C01B 39/48* (2013.01); *C01P 2004/03* (2013.01); *C01P 2004/64* (2013.01); *C01P 2006/12* (2013.01); *C01P 2006/14* (2013.01); *C01P 2006/16* (2013.01)

(58) Field of Classification Search
CPC ............... B01J 29/7007; B01J 2229/16; B01J 2229/34; B01J 2229/38; B01J 35/0013; B01J 35/1019; B01J 35/023; B01J 35/1023; B01J 35/1042; B01J 35/1047; B01J 35/1061; B01J 35/109; B01J 37/03; B01J 37/0018; B01J 37/04; B01J 37/06; C01B 39/48; C01P 2004/03; C01P 2004/64; C01P 2006/14; C01P 2006/12; C01P 2006/16
USPC ............................................ 502/60; 423/700
See application file for complete search history.

(56) References Cited

U.S. PATENT DOCUMENTS

| | | | |
|---|---|---|---|
| 7,462,276 B2 | 12/2008 | Wang et al. | |
| 10,807,078 B2 * | 10/2020 | Eid | ................. B01J 37/0018 |
| 2018/0333708 A1 | 11/2018 | Ding et al. | |
| 2020/0156052 A1 | 5/2020 | Eid et al. | |

OTHER PUBLICATIONS

Al-Eid et al., "A facile method to synthesize hierarchical nano-sized zeolite beta", Microporous and Mesoporous Materials, vol. 279, pp. 99-106, 2019.
Camblor et al., "Influence of the synthesis conditions on the crystallization of zeolite Beta", Zeolites, vol. 11, pp. 792-797, Nov./Dec. 1991.
Camblor et al., "Characterization of nanocrystalline zeolita Beta", Microporous and Mesoporous Materials, vol. 25, pp. 59-74, 1998.
Ding et al., "Effect of agitation on the synthesis of zeolite beta and its synthesis mechanism in absence of alkali cations", Microporous and Mesoporous Materials, vol. 94, pp. 1-8, 2006.
Ding et al., "LCO hydrotreating with Mo—Ni and W—Ni supported on nano- and micro-sized zeolite beta", Applied Catalysis A: General, vol. 353, pp. 17-23, 2009.
Garcia-Martinez et al., "A mesostructured Y zeolite as a superior FCC catalyst—from lab to refinery", Chem Commun. vol. 48, pp. 11841-11843, 2012.
Kim et al., "Oligomerization and isomerization of dicyclopentadiene over mesoporous materials produced from zeolite beta", Catalysis Today, vol. 232, pp. 69-74, 2014.
Landau et al., "Colloidal Nanocrystals of Zeolite B Stablized in Alumina Matrix", Chem. Mater., vol. 11, pp. 2030-2037, 1999.
Prokesova et al., "Preparation of nanosized micro/mesoporous composites via simultaneous synthesis of Beta/MCM-48 phases", Microporous and Mesoporous Materials, vol. 64, pp. 165-174, 2003.
Notification of Transmittal of the International Search Report and the Written Opinion of the International Searching Authority, or the Declaration dated Mar. 25, 2024 pertaining to International application No. PCT/US2023/079968 filed Nov. 16, 2023, pp. 1-14.

(Continued)

*Primary Examiner* — Elizabeth D Wood
(74) *Attorney, Agent, or Firm* — DINSMORE & SHOHL LLP

(57) ABSTRACT

Methods for synthesizing a mesoporous nano-sized zeolite beta are described. The method may include mixing an aqueous base solution with hexadecyltrimethylammonium bromide (CTAB) to form a first solution; adding nano-sized zeolite particles having a particle size of less than or equal to 100 nm to the first solution to form a second solution. The nano-sized zeolite particles include a microporous framework with a plurality of micropores having diameters of less than or equal to 2 nm and a BEA framework type. The method may further include transferring the second solution to an autoclave operated at 25° C. to 200° C. for 3 to 24 hours to form a colloid; drying the colloid at 100° C. to 200° C. for 8 to 36 hours without washing the colloid to form a zeolite precursor; and calcining the zeolite precursor at 250° C. to 600° C. for 1 to 8 hours to form the mesoporous nano-sized zeolite beta.

18 Claims, No Drawings

(56) References Cited

OTHER PUBLICATIONS

Yang, Guochao et al. "Preparation of [beta] zeolite with intracrystalline mesoporosity via surfactant-templating strategy and its application in ethanol-acetaldehyde to butadiene" Microporous and Mesoporous Materials, Mar. 1, 2021, vol. 316, 110949, pp. 1-9.

Escola, J.M. et al. "Synthesis of hierarchical Beta zeolite with uniform mesopores: Effect on its catalytic activity for veratrole acylation" Catalysis Today, Apr. 1, 2018, vol. 304, pp. 89-96.

Suárez, Natalia et al "Generation of hierarchical porosity in beta zeolite by post-synthesis treatment with the cetyltrimethylammonium cationic surfactant under alkaline conditions" Microporous and Mesoporous Materials, Feb. 4, 2019, vol. 280, pp. 144-150.

\* cited by examiner

METHOD FOR SYNTHESIZING MESOPOROUS NANO-SIZED ZEOLITE BETA

BACKGROUND

Field

The present disclosure generally relates to nano-sized mesoporous zeolite compositions and the methods of synthesis and use of these compositions, and more specifically, to method for synthesizing a mesoporous nano-sized zeolite beta without intermediate washing steps.

Technical Background

Beta zeolites are crystallized aluminosilicates that are widely used in heavy oil conversion processes such as hydrocracking and fluid catalytic cracking processes. The feedstock to these processes is a portion of the crude oil that has an initial boiling point of 350 Celsius (° C.) and an average molecular weight ranging from about 200 to 600 or greater. Macroporous materials have pores size distributions between 50 and 1000 nanometers (nm). Mesoporous materials have an intermediate pore size distributions, between 2-50 nm. And, microporous materials exhibit pore size distributions in the range of 0.5-2 nm. Conventional beta zeolites have pore sizes (<2 mil) that do not allow the large molecules to diffuse hi and to react on the active sites located inside the zeolites, increasing pore size and reducing particle size of the zeolites are two effective ways to enhance mass transfer and thus greatly improve catalyst performance.

Nano-sized zeolite beta have been generated, but their synthesis has traditionally required an intermediate washing step which decreases yield and thus impedes economic stability of mesoporous zeolite manufacturing.

BRIEF SUMMARY

Accordingly, there is a clear and long-standing need to provide a solution to synthesizing a mesoporous nano-sized zeolite beta in a more economical manner. The present disclosure addresses such long-standing need by generating mesoporous nano-sized zeolite beta according to a method which allows for all intermediate washing steps to be eliminated during zeolite preparation. It will be readily appreciated that elimination of washing steps improves zeolite yields while concurrently reducing operating costs through fewer process operations.

In accordance with one embodiment of the present disclosure, a method for synthesizing a mesoporous nano-sized zeolite beta includes mixing an aqueous base solution with hexadecyltrimethylammonium bromide (CTAB) to form a first solution; adding nano-sized zeolite particles having a particle size of less than or equal to 100 nm to the first solution to form a second solution, wherein the nano-sized zeolite particles comprise a microporous framework comprising a plurality of micropores having diameters of less than or equal to 2 nm and a BEA framework type; transferring the second solution to an autoclave operated at 25° C. to 200° C. for 3 to 24 hours to form a colloid; drying the colloid at 100° C. to 200° C. for 8 to 36 hours without washing the colloid to form a zeolite precursor; and calcining the zeolite precursor at 250° C. to 600° C. for 1 to 8 hours to form the mesoporous nano-sized zeolite beta.

Additional features and advantages of the technology disclosed herein will be set forth in the detailed description which follows, and in part will be readily apparent to those skilled in the art from that description or recognized by practicing the technology as described herein, including the detailed description which follows, as well as the appended claims.

It is to be understood that both the foregoing general description and the following detailed description present embodiments of the technology, and are intended to provide an overview or framework for understanding the nature and character of the technology as it is claimed. Additionally, following descriptions are meant to be merely illustrative, and are not intended to limit the scope of the claims in any manner.

DETAILED DESCRIPTION

The present disclosure describes various embodiments related to nano-sized mesoporous zeolite compositions and methods of synthesis of these compositions.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

Zeolite catalysts are commonly used in heavy oil conversion processes such as hydrocracking and fluid catalytic cracking processes. For example, crude oil may passed through hydro-treating and then hydrocracking catalysts to remove undesired contents, such as sulfur, nitrogen, and metals, and convert high molecular weight hydrocarbons (complex aromatics or unsaturated hydrocarbons) into naphtha, kerosene, gasoline, diesel oil or high-quality lubricating oils. The catalyst used in hydroprocessing has two functions: cracking of high molecular weight hydrocarbons and hydrogenating the unsaturated molecules. However, the small pore size of the most widely used zeolites in hydrocracking catalysts (zeolite beta and Y) has a negative impact on the performance of the catalyst by preventing the large molecules in the heavy oil fraction from diffusing into the active sites located inside the zeolites. This leads to decreased activity of the catalysts and a possible deactivation of the catalysts. The poor diffusion efficiency of the large molecules can be mitigated by either increasing the pore size of the zeolite catalysts, or reducing the particle size of the zeolite catalysts, or combining both features. Disclosed here are ordered mesoporous zeolite compositions with average pore size of greater than 3 nm and a particle size of less than 100 nm. Reduction in particle size during the synthesis of the zeolite catalysts impacts the performance of the zeolite catalysts by increasing the external surface area of the catalyst and shortening the diffusion path of the reactants and products.

Previous methods of synthesizing mesoporous nano-sized beta zeolite have generated mesopores by desilication via NaOH or $NH_3$ and hydrothermal treatment. However, such methods also required separation and washing steps after hydrothermal treatment to remove species before calcination of the zeolite. Embodiments in accordance with the present disclosure have developed alternative methods for synthesizing a mesoporous nano-sized zeolite beta which leverage desilication via NaOH or $NH_3$ but do not require intermediate washing steps. Such upgraded synthesis method improves synthesized zeolite yields, reduces operating costs, and enhances economic viability of mesoporous nano-sized zeolite beta manufacturing.

Generally described in this disclosure are embodiments of BEA framework type zeolites such as zeolite Beta that may be incorporated into hydrotreating catalysts. The present disclosure relates to methods for producing such zeolites, as well as the properties and structure of the produced zeolites. In some embodiments, the hydrotreating catalysts may be utilized to crack aromatics in heavy oils in a pretreatment process that may take place prior to steam cracking or other downstream processing. According to one or more embodiments, a zeolite composition formed in accordance with the present disclosure may comprise a relatively small particle size and may include mesoporosity. Such zeolite materials may be referred to throughout this disclosure as "mesoporous nano-sized zeolite beta." As used throughout this disclosure, "zeolites" refer to micropore-containing inorganic materials with regular intra-crystalline cavities and channels of molecular dimension. The microporous structure of zeolite s (for example, 0.3 nm to 1 nm pore size) may render large surface areas and desirable size-/shape-selectivity, which may be advantageous for catalysis. The mesoporous zeolite s described may include, for example, aluminosilicates, titanosilicates, or pure silicates. In one or more embodiments, the zeolites described may include micropores (present in the microstructure of a zeolite), and additionally include mesopores. As used throughout this disclosure, micropores refer to pores in a zeolitic structure that have a diameter of less than or equal to 2 nm and greater than or equal to 0.1 nm, and mesopores refer to pores in a zeolitic structure that have a diameter of greater than 2 nm and less than or equal to 50 nm. The zeolite s presently described may be characterized as Beta (that is, having an aluminosilicate BEA framework type).

Disclosed here are specific methods of synthesis of these nano-sized mesoporous zeolite compositions. In accordance with the present disclosure, a method for synthesizing a mesoporous nano-sized zeolite beta comprises mixing an aqueous base solution with hexadecyltrimethylammonium bromide (CTAB) to form a first solution; and adding nano-sized zeolite particles having a particle size of less than or equal to 100 nm to the first solution to form a second solution, wherein the nano-sized zeolite particles comprise a microporous framework comprising a plurality of micropores having diameters of less than or equal to 2 nm and a BEA framework type; and the second solution is transfer to an autoclave operated at 25° C. to 200° C. for 3 to 24 hours to form a colloid. Subsequently, the colloid is dried at 100° C. to 200° C. for 8 to 36 hours to form a zeolite precursor. It is expressly noted that the colloid is dried without an intervening washing upon removal from the autoclave. Finally, the zeolite precursor is calcined at 250° C. to 600° C. for 1 to 8 hours to form the mesoporous nano-sized zeolite beta. The method of synthesizing mesoporous nano-sized zeolite beta and each distinct step is discussed in further infra.

In one or more embodiments, a first solution is formed. Specifically, an aqueous base solution is mixed with hexadecyltrimethylammonium bromide (CTAB) to form the first solution. In an embodiment, the aqueous base solution comprises one or more of NaOH or $NH_3$. In accordance with various embodiments, the aqueous base solution is a 0.1 to 1.0 M $NH_3$ solution, a 0.1 to 0.8 M $NH_3$ solution, a 0.3 to 1.0 M $NH_3$ solution, a 0.3 to 0.6 M $NH_3$ solution, or an approximately 0.5 M $NH_3$ solution. In accordance with various embodiments, the aqueous base solution is a 0.1 to 1.0 M NaOH solution, a 0.1 to 0.8 M NaOH solution, a 0.3 to 1.0 M NaOH solution, a 0.3 to 0.6 M NaOH solution, or an approximately 0.5 M NaOH solution.

In various embodiments, the aqueous base solution and the CTAB may be mixed for 1 to 30 minutes, 5 to 30 minutes, 5 to 15 minutes, or approximately 10 minutes. It will be appreciated that mixing time is desired to be sufficient to completely dissolve the CTAB into the aqueous base solution to generate the first solution.

In one or more embodiments, nano-sized zeolite particles are added to the first solution to form a second solution. The nano-sized zeolite particles may have an average particle size of less than or equal to 100 nm, less than or equal to 90 nm, less than or equal to 85 nm, or less than or equal to 80 nm in various embodiments. Further, the nano-sized zeolite particles comprise a BEA framework type such as zeolite Beta. Additionally, the nano-sized zeolite particles comprise a microporous framework including a plurality of micropores having average diameters of less than or equal to 2 nm. However, it will be appreciated that the nano-sized zeolite particles may also include mesopores.

It will be appreciated that various nano-sized zeolite particles may be utilized, with the methods of the present disclosure increasing the mesoporosity of such nano-sized zeolite particles. In one or more embodiments, the nano-sized zeolite particles may comprise a surface area of 590 $m^2/g$, a pore volume of 0.83 mug split as a micropore volume of 0.15 mug and a mesopore volume of 0.68 mug, an average pore size of 2.8 nm, and average particle size of 80 nm.

In various embodiments, the second solution may be mixed for 1 to 60 minutes, 5 to 40 minutes, 10 to 30 minutes, or approximately 20 minutes after addition of the nano-sized zeolite particles to the first solution prior to heating the second solution in the autoclave. During mixing of the second solution, the aqueous base solution present in the first solution removes silicon from the zeolite structure of the nano-sized zeolite particles to generate mesoporosity. The CTAB included in the first solution may fill the voids and act as a templating agent to retain the zeolite structures and mesoporosity during further processing.

In various embodiments, the mass ratio of CTAB to nano-sized zeolite particles in the second solution is in the range of 0.1 to 1.0, 0.1 to 0.8, 0.1 to 0.5, 0.2 to 0.5, or approximately 0.3. It will be appreciated that if too little CTAB is present, the CTAB would be insufficient to functioned as a stabiliser to avoid zeolite structure damage during the desilication with base solution. Additionally, excess CTAB provides a greater expense with more CTAB lost during washing along with the commensurate environmental concerns stemming from such discharge.

In various embodiments, the ratio of volume of the aqueous base solution to the mass of the nano-sized zeolite particles in the second solution is in the range of 2 to 40, 5 to 40, 8 to 30, or 10 to 20. It will be appreciated that if such ratio is too small, insufficient silicon is removed from the zeolite framework resulting in less mesoporosity bring formed. Conversely, if such ratio is too large, too much silicon may be removed resulting in destruction of the zeolite structure.

In one or more embodiments, the second solution is transferred to an autoclave where a colloid is formed. Specifically, the aqueous base solution desilicates the nano-sized zeolite particles in the second solution during processing in the autoclave.

In various embodiments, the second solution is heated in the autoclave operated at 25° C. to 200° C., 80° C. to 175° C., 90° C. to 150° C. 120° C. to 160° C. 140° C. to 160° C., or approximately 150° C. Further, in various embodiments, the second solution may be heated in the autoclave for 3 to 24 hours, 4 to 20 hours, 5 to 18 hours, 6 to 14 hours, 8 to 12 hours, or approximately 10 hours.

In one or more embodiments, the autoclave is quenched with water. It will be appreciated that quenching abruptly stops any reaction in the autoclave and ensures the reaction time for all syntheses remain the same across multiple production runs. It will also be appreciated, that the water used to quench the autoclave is not necessarily limited to distilled water and tap or purified water may be utilized as the quenching water does not make contact with contents of the autoclave. In one or more embodiments, the water may be cold water which for purposes of the present disclosure is defined as water at or less than 30° C. In various embodiments, the autoclave may be quenched for 1 hour, 1.5 hours, 2 hours, 3 hours, or 4 hours. In further embodiments, the autoclave may be cooled to room temperature naturally.

In one or more embodiments, the colloid is dried to form a zeolite precursor. In various embodiments, the colloid may be dried at an elevated drying temperature of 100° C. to 200° C., 100° C. to 180° C., 100° C. to 160° C., 110° C. to 150° C., 100° C. to 140° C., 100° C. to 130° C., 100° C. to 120° C., or 100° C. to 110° C. Further, in various embodiments, the washed colloid may be dried at the elevated drying temperature for a period of 6 to 36 hours, 10 to 30 hours, 12 to 24 hours, 6 to 18 hours, 8 to 14 hours, or 8 to 12 hours. Alternatively, the period of drying at the elevated drying temperature may be considered overnight.

It is expressly note that in accordance with embodiments of the present disclosure that the colloid generated from heating in the autoclave is not washed. However, in one or more embodiments, the colloid is processed in a centrifuge to remove excess water prior to drying the colloid.

In one or more embodiments, the zeolite precursor is calcined to form the mesoporous nano-sized zeolite beta. In various embodiments, the zeolite precursor may be calcined at an elevated calcining temperature of 250° C. to 600° C., 300° C. to 600° C., 400° C. to 600° C., 450° C. to 600° C., 500° C. to 600° C., 550° C. to 600° C., or approximately 550° C. Further, in various embodiments, the zeolite precursor may be calcined at the elevated calcining temperature for a period of 1 to 8 hours, 2 to 6 hours, 3 to 6 hours, 4 to 8 hours, 4 to 5 hours, or approximately 4 hours. In one or more embodiments, the ramp rate during calcining is 2 to 4° C. per minute.

Properties of the mesoporous nano-sized zeolite beta include an average particle size ranging from 10 nm to 100 nm. The average particle size is based on SEM measurement. In some embodiments, the mesoporous nano-sized zeolite beta have a particle size ranging from 10 nm to 90 nm, 20 nm to 100 nm, 30 nm to 100 nm, 40 nm to 100 nm, or 50 nm to 100 nm. The surface area of the mesoporous nano-sized zeolite beta can range from 500 square meters per gram ($m^2/g$) to 800 $m^2/g$. In some embodiments, surface area of the mesoporous nano-sized zeolite pbeta can range from 500 $m^2/g$ to 700 $m^2/g$, 500 $m^2/g$ to 650 $m^2/g$, 550 $m^2/g$ to 800 $m^2/g$, 550 $m^2/g$ to 700 $m^2/g$, or 600 $m^2/g$ to 650 $m^2/g$. The average particle size is based on the Brunauer-Emmett-Teller technique (BET) measurement. The pore volume of the nano-sized zeolite beta can range from 1.0 milliliters per gram (mug) to 2.0 mug. In some embodiments, the pore volume of the mesoporous nano-sized zeolite beta can range from 1.0 mug to 1.8 mug, 1.0 mug to 1.6 mug, 1.0 mug to 1.5 mug, or 1.0 mug to 1.4 mug. The average pore size of the mesoporous nano-sized zeolite beta can be greater than 3 nm, such as in the range from 3 nm to 50 nm. In some embodiments, the average pore size of the mesoporous nano-sized zeolite beta can range from 2 nm to 40 nm, 5 nm to 30 nm, 5 nm to 50 nm, 5 nm to 30 nm. Alternatively, in various embodiments, the average pore size of the mesoporous nano-sized zeolite beta may be greater than 4 nm, greater than 5 nm, greeter than 6 nm, or greater than 7 nm. The pore size may be determined from the surface area and pore volume.

A majority of the pore volume of the mesoporous nano-sized zeolite beta is mesoporous. In various embodiments, at least 60 percent by volume, at least 65 percent by volume, at least 70 percent by volume, at least 75 percent by volume, or at least 80 percent by volume of the pore volume of the mesoporous nano-sized zeolite beta is mesoporous.

Embodiments of the presently disclosed methods for synthesizing a mesoporous nano-sized zeolite beta do not require the step of washing the colloid to removed alkali cations. Elimination of such washing step increases yield and reduces operating expenses. Specifically, as one or more steps from a conventional zeolite process are eliminated there is a reduction in operating costs as well as an increase in the synthesized zeolite yields which enhances the economics of mesoporous nano-sized zeolite beta manufacturing.

EXAMPLES

The methods for synthesizing a mesoporous nano-sized zeolite beta will be further clarified by the following examples. The examples are illustrative in nature, and should not be understood to limit the subject matter of the present disclosure.

Four samples of mesoporous nano-sized zeolite beta were prepared to compare synthesis via a conventional method and synthesis in accordance with methods of the present disclosure. The synthesis of mesoporous nano-sized zeolite beta using a conventional method including at least one washing step is presented as Comparative Example 1 and Comparative Example 3. The synthesis of mesoporous nano-sized zeolite beta omitting all washing steps is presented as Inventive Example 2 and Inventive Example 4. It is noted that Inventive Example 2 includes a single separation via centrifuge, but it is expressly stated the preparation method omits all washing steps.

Comparative Example 1

Mesoporous nano-sized zeolite beta was prepared with a washing step for comparative example 1. In a first vessel, 2.1 ml of concentrated ammonia (15M $NH_3 \cdot H_2O$) from Sigma Aldrich was added into 60.4 grams of $H_2O$. The water was purified water without impurities such as Mg, Na, Ca, Cl. It is noted that it is desirable to not introduce impurities, especially Mg, Ca, Na cations, as such impurities can be deposited on the zeolite to neutralize the acidic sites reducing the zeolite acidity, and potentially reduce the zeolite stability. It is noted that the concentrated ammonia and water formed 62.5 grams of 5M $NH_3 \cdot H_2O$. To the 62.5 grams of 5M $NH_3 \cdot H_2O$, 1.12 grams of CTAB was added and the resulting first solution was stirred for 10 minutes. After mixing, 4.56 grams of nano-beta zeolite was added to the first solution and stirred for 20 minutes to form a second solution. The nano-sized zeolite beta was the nano-sized zeolite beta disclosed in L. Ding, et al. Microporous and Mesoporous Materials 94 (2006) 1-8. The second solution was subsequently transferred into a PTFE lined stainless steel autoclave, sealed, and heated. The autoclave was operated at 100° C. for ten hours followed by quenching with water. The colloid formed in the autoclave was then washed in a high-speed centrifuge three times. The solid zeolite products were then dried at 110° C. overnight, and calcined at 550° C. for 4 hours at a ramp of 2° C. per minute.

Inventive Example 2

In accordance with embodiments of the present disclosure, mesoporous nano-sized zeolite beta was prepared without a washing step for Inventive Example 2. In a first vessel, 4.2 ml of concentrated ammonia (15M $NH_3 \cdot H_2O$) from Sigma Aldrich) was added into 120.9 grams of $H_2O$. The water was the same purified water utilized of Comparative Example 1, purified with Reverse Osmosis (RO) water purification technology. It is noted that the concentrated ammonia and water formed 125 grams of 5M $NH_3 \cdot H_2O$. To the 125 grams of 5M $NH_3 \cdot H_2O$, 2.3 grams of CTAB was added and the resulting first solution was stirred for 10 minutes. After mixing, 9.12 grams of nano-beta zeolite was added to the first solution and stirred for 20 minutes to form a second solution. It is noted that the nano-beta zeolite was the same nano-beta zeolite utilized for Comparative Example 1. The second solution was subsequently transferred into a PTFE lined stainless steel autoclave, sealed, and heated. The autoclave was operated at 100° C. for ten hours and subsequently quenched with water. The colloid formed in the autoclave was then separated from excess water via centrifuge a single time. However, it is expressly noted that no washing or rinsing of the colloid was undertaken. The solid zeolite products were then dried at 110° C. overnight, and calcined at 550° C. for 4 hours at a ramp of 2° C. per minute.

The synthesis parameters of Comparative Example 1 and Inventive Example 2 are presented below in Table 1. It is noted that the zeolite contains about 17.8% of water. As such, in the calculation of the Base solution to Zeolite ratio where the zeolite is on a dry basis the moisture must be accounted for. Specifically, the 4.56 g zeolite includes 3.75 g dry based zeolite resulting in the presented volume-to-weight ratio of base solution to zeolite of 16.67. Similarly, the CTAB to Zeolite ratio is also calculated on a dry basis of zeolite.

TABLE 1

Synthesis Parameters of Comparative Example 1 and Inventive Example 2

|  | Comparative Example 1 | Inventive Example 2 |
|---|---|---|
| Involve washing step after autoclave treatment | Yes | No |
| Base solution to Zeolite ratio (volume:weight) | 16.67 | 16.67 |
| Base Type | 0.5M $NH_3 \cdot H_2O$ | 0.5M $NH_3 \cdot H_2O$ |
| CTAB to Zeolite ratio (weight:weight) | 0.3 | 0.3 |
| Components |  |  |
| Zeolite, g | 4.56 | 9.12 |
| $NH_3 \cdot H_2O$ volume, ml | 62.51 | 125.03 |
| Concentrated $NH_3 \cdot H_2O$ (15M), ml | 2.1 | 4.2 |
| $H_2O$, ml | 60.4 | 120.9 |
| CTAB, g | 1.125 | 2.3 |
| Autoclave Processing |  |  |
| Temperature, ° C. | 100 | 100 |
| Time, hour | 10 | 10 |

Comparative Example 3 and Inventive Example 4

Additional colloid was formed in the same manner as in Inventive Example 2, except the autoclave was operated at 150° C., and divided into two sub-samples for further processing. For Comparative Example 3, one of the sub-samples was washed in a high-speed centrifuge three times with the excess water removed after each centrifuging cycle. The solid zeolite products were then dried at 110° C. overnight, and calcined at 550° C. for 4 hours at a ramp of 2"C per minute to form the mesoporous nano-sized zeolite beta of Comparative Example 3, Conversely, for Inventive Example 4, the remaining sub-sample was dried at 110° C. overnight without the intervening washing and centrifuging processes. The dried sample was then calcined at 550° C. for 4 hours at a ramp of 2° C. per minute to form the mesoporous nano-sized zeolite beta of inventive Example 4.

The nano-beta zeolite used in each of Comparative Examples 1 and 3 and Inventive Examples 2 and 4 comprises a surface area of 590 $m^2/g$, a pore volume of 0.83 mug split as a micropore volume of 0.15 mug and a mesopore volume of 0.68 mug, an average pore size of 2.8 nm, and average particle size of 80 nm.

The synthesis parameters of the mesoporous nano-size zeolite beta of Comparative Example 3 and Inventive Example 4 are presented below in Table 2.

TABLE 2

Synthesis Parameters of Comparative Example 3 and Inventive Example 4

|  | Comparative Example 3 | Inventive Example 4 |
|---|---|---|
| Base solution to Zeolite ratio (volume:weight) | 16.67 | 16.67 |
| Base Type | 0.5M $NH_3 \cdot H_2O$ | 0.5M $NH_3 \cdot H_2O$ |
| CTAB to Zeolite ratio (weight:weight) | 0.3 | 0.3 |
| Components |  |  |
| Zeolite, g | 4.56 | 4.56 |
| $NH_3 \cdot H_2O$ volume, ml | 62.52 | 62.52 |
| Concentrated $NH_3 \cdot H_2O$ (15M), ml | 2.1 | 2.1 |
| $H_2O$, ml | 60.45 | 60.45 |
| CTAB, g | 1.15 | 1.15 |
| Autoclave Processing |  |  |
| Temperature, ° C. | 150 | 150 |
| Time, hour | 10 | 10 |

The properties of the mesoporous nano-size zeolite beta of Comparative Example 1, Inventive Example 2, Comparative Example 3 and Inventive Example 4 are presented below in Table 3. The average particle size is based on SEM measurement. The average pore sizes were determined from the surface area using Brunauer-Emmett-Teller (BET) technique and pore volume. The XRD crystallinity was determined with CP-814E (Zeolyst International) used as the reference.

TABLE 3

Mesoporous Nano-Sized Zeolite Beta Properties

|  | Comparative Example 1 | Inventive Example 2 | Comparative Example 3 | Inventive Example 4 |
|---|---|---|---|---|
| Surface area, $m^2/g$ | 583 | 604 | 459 | 617 |
| Micropore | 307 | 344 | 220 | 341 |
| Mesopore | 275 | 260 | 239 | 276 |
| Pore Volume, $m^2/g$ | 1.1 | 1.1 | 1.15 | 1.3 |
| Micropore | 0.154 | 0.2 | 0.1 | 0.17 |
| Mesopore | 0.946 | 0.9 | 1.05 | 1.16 |
| Average pore size, nm | 7.6 | 7.1 | 10.1 | 8.74 |

TABLE 3-continued

Mesoporous Nano-Sized Zeolite Beta Properties

| | Comparative Example 1 | Inventive Example 2 | Comparative Example 3 | Inventive Example 4 |
|---|---|---|---|---|
| XRD Phase | Beta | Beta | Beta | Beta |
| Crystallinity, % | 93% | 99% | 53% | 57% |

As shown in Table 3, the zeolites prepared via conventional synthesis methods with a washing step (Comparative Example I and Comparative Example 3) were similar to the zeolites prepared via the methods in accordance with the present disclosure with no washing step (Inventive Example 2 and Inventive Example 4). Specifically, comparison of Comparative Example 1 and Inventive Example 2 illustrates that omission of the washing step still achieved a desirable zeolite product. Similarly, comparison of Comparative Example 3 and Inventive Example 4 illustrates that omission of the washing step still achieved a desirable zeolite product. As such, it is demonstrated that in accordance with the methods of the present disclosure, traditional washing steps present in the preparation of zeolites may be omitted to generate mesoporous nano-sized zeolite beta.

Based on the foregoing, it should now be understood that various aspects of method and systems for producing aromatics and light olefins from a mixed plastics stream are disclosed herein.

According to a first aspect of the present disclosure, a method for synthesizing a mesoporous nano-sized zeolite beta comprises mixing an aqueous base solution with hexadecyltrimethylammonium bromide (CTAB) to form a first solution; adding nano-sized zeolite particles having a particle size of less than or equal to 100 nm to the first solution to form a second solution, wherein the nano-sized zeolite particles comprise a microporous framework comprising a plurality of micropores having diameters of less than or equal to 2 nm and a BEA framework type; transferring the second solution to an autoclave operated at 25° C. to 200° C. for 3 to 24 hours to form a colloid; drying the colloid at 100° C. to 200° C. for 8 to 36 hours without washing the colloid to form a zeolite precursor; and calcining the zeolite precursor at 250° C. to 600° C. for 1 to 8 hours to form the mesoporous nano-sized zeolite beta.

A second aspect includes the method of the first aspect, in which the mesoporous nano-sized zeolite beta comprises an average particle size, based on SEM measurement, of 10 to 100 nanometers.

A third aspect includes the method of the first or second aspects, in which the mesoporous nano-sized zeolite beta comprises a surface area, based on BET measurement, of 500 to 800 m$^2$/g.

A fourth aspect includes the method of any of the first through third aspects, in which the mesoporous nano-sized zeolite beta comprises a pore volume of 1.0 to 2.0 mug.

A fifth aspect includes the method of any of the first through fourth aspects, in which at least 60 percent by volume of the pore volume is mesoporous.

A sixth aspect includes the method of any of the first through fifth aspects, in which the mesoporous nano-sized zeolite beta comprises an average pore size of greater than 3 nm.

A seventh aspect includes the method of any of the first through sixth aspects, in which the aqueous base solution comprises one or more of NaOH or NH$_3$.

An eighth includes the method of any of the first through seventh aspects, in which the aqueous base solution is a 0.1 to 1.0 M NH$_3$ or NaOH solution.

A ninth aspect includes the method of any of the first through eighth aspects, in which the aqueous base solution is a 0.5 M NH$_3$ solution.

A tenth aspect includes the method of any of the first through ninth aspects, in which the mass ratio of CTAB to nano-sized zeolite particles in the second solution is in the range of 0.1 to 1.0.

An eleventh aspect includes the method of any of the first through tenth aspects, in which the ratio of volume of the aqueous base solution to the mass of the nano-sized zeolite particles in the second solution is in the range of 2 to 40.

A twelfth aspect includes the method of any of the first through eleventh aspects, in which the first solution is mixed for 1 to 30 minutes prior to adding the nano-sized zeolite particles to form the second solution.

A thirteenth aspect includes the method of any of the first through twelfth aspects, in which the second solution is mixed for 1 to 60 minutes prior to heating the second solution in the autoclave.

A fourteenth aspect includes the method of any of the first through thirteenth aspects, in which the autoclave is operated at 90° C. to 150° C. for 8 to 12 hours.

A fifteenth aspect includes the method of any of the first through fourteenth aspects, in which the colloid is dried at 100° C. to 120° C. for 8 to 12 hours.

A sixteenth aspect includes the method of any of the first through fifteenth aspects, in which the zeolite precursor is calcined at 550° C. to 600° C. for 3 to 6 hours to form the mesoporous nano-sized zeolite beta.

A seventeenth aspect includes the method of any of the first through sixteenth aspects, in which the ramp rate during calcining is 2 to 4° C. per minute.

An eighteenth aspect includes the method of any of the first through seventeenth aspects, in which wherein the colloid is processed in a centrifuge to remove excess water prior to drying the colloid.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided. Further, it should be understood that any two quantitative values assigned to a property may constitute a range of that property, and all combinations of ranges formed from all stated quantitative values of a given property are contemplated in this disclosure.

As used in this disclosure and in the appended claims, the words "comprise," "has," and "include" and all grammatical variations thereof are each intended to have an open, non-limiting meaning that does not exclude additional elements or steps.

Throughout the present description, numerous details are set forth in order to provide a thorough understanding of the various embodiments. In other instances, well-known processes, devices, and systems may not been described in particular detail in order not to unnecessarily obscure the various embodiments, but such would be obtainable by one skilled in the art. Additionally, illustrations of the various embodiments may omit certain features or details in order to not obscure the various embodiments.

What is claimed is:

1. A method for synthesizing a mesoporous nano-sized zeolite beta, the method comprising:
    mixing an aqueous base solution with hexadecyltrimethylammonium bromide (CTAB) to form a first solution;
    adding nano-sized zeolite particles having a particle size of less than or equal to 100 nm to the first solution to form a second solution, wherein the nano-sized zeolite particles comprise a microporous framework comprising a plurality of micropores having diameters of less than or equal to 2 nm and a BEA framework type;
    transferring the second solution to an autoclave operated at 25° C. to 200° C. for 3 to 24 hours to form a colloid;
    drying the colloid at 100° C. to 200° C. for 8 to 36 hours without washing the colloid to form a mesoporous nano-sized zeolite beta precursor; and
    calcining the mesoporous nano-sized zeolite beta precursor at 250° C. to 600° C. for 1 to 8 hours to form the mesoporous nano-sized zeolite beta.

2. The method of claim 1, wherein the mesoporous nano-sized zeolite beta comprises an average particle size, based on SEM measurement, of 10 to 100 nanometers.

3. The method of claim 1, wherein the mesoporous nano-sized zeolite beta comprises a surface area, based on BET measurement, of 500 to 800 $m^2/g$.

4. The method of claim 1, wherein the mesoporous nano-sized zeolite beta comprises a pore volume of 1.0 to 2.0 mug.

5. The method of claim 4, wherein the mesoporous nano-sized zeolite beta has a total pore volume, wherein at least 60 percent of the total pore volume comprises mesopores.

6. The method of claim 1, wherein the mesoporous nano-sized zeolite beta comprises an average pore size of greater than 3 nm.

7. The method of claim 1, wherein the aqueous base solution comprises one or more of NaOH or $NH_3$.

8. The method of claim 1, wherein the aqueous base solution is a 0.1 to 1.0 M $NH_3$ or NaOH solution.

9. The method of claim 1, wherein the aqueous base solution is a 0.5 M $NH_3$ solution.

10. The method of claim 1, wherein the mass ratio of CTAB to nano-sized zeolite particles in the second solution is in the range of 0.1 to 1.0.

11. The method of claim 1, wherein the ratio of volume of the aqueous base solution to the mass of the nano-sized zeolite particles in the second solution is in the range of 2 to 40.

12. The method of claim 1, wherein the first solution is mixed for 1 to 30 minutes prior to adding the nano-sized zeolite particles to form the second solution.

13. The method of claim 1, wherein the second solution is mixed for 1 to 60 minutes prior to heating the second solution in the autoclave.

14. The method of claim 1, wherein the autoclave is operated at 90° C. to 150° C. for 8 to 12 hours.

15. The method of claim 1, wherein the colloid is dried at 100° C. to 120° C. for 8 to 12 hours.

16. The method of claim 1, wherein the mesoporous nano-sized zeolite beta precursor is calcined at 550° C. to 600° C. for 3 to 6 hours to form the mesoporous nano-sized zeolite beta.

17. The method of claim 1, wherein a ramp rate during calcining is 2 to 4° C. per minute.

18. The method of claim 1, wherein the colloid is processed in a centrifuge to remove excess water prior to drying the colloid.

* * * * *